(12) United States Patent
Dhoolam et al.

(10) Patent No.: US 10,505,862 B1
(45) Date of Patent: Dec. 10, 2019

(54) OPTIMIZING FOR INFRASTRUCTURE DIVERSITY CONSTRAINTS IN RESOURCE PLACEMENT

(71) Applicant: Amazon Technologies, Inc., Seattle, WA (US)

(72) Inventors: Surya Prakash Dhoolam, Seattle, WA (US); Christopher Magee Greenwood, Seattle, WA (US); Mitchell Gannon Flaherty, Seattle, WA (US); Nishant Satya Lakshmikanth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 519 days.

(21) Appl. No.: 14/625,535

(22) Filed: Feb. 18, 2015

(51) Int. Cl.
*G06F 9/50* (2006.01)
*G06F 9/455* (2018.01)
*H04L 12/911* (2013.01)

(52) U.S. Cl.
CPC .......... *H04L 47/70* (2013.01); *G06F 9/45558* (2013.01); *G06F 9/50* (2013.01)

(58) Field of Classification Search
CPC .... G06F 9/5005–5088; G06F 9/45533–45558; G06F 2009/45562–45595; H04L 47/70–829
See application file for complete search history.

(56) References Cited

U.S. PATENT DOCUMENTS

| | | | |
|---|---|---|---|
| 6,616,344 B1 * | 9/2003 | Van Deventer .... | H04Q 11/0005 385/135 |
| 7,647,329 B1 * | 1/2010 | Fischman ......... | G06F 17/30094 707/999.1 |
| 7,822,869 B2 | 10/2010 | Zuckerman et al. | |
| 8,291,411 B2 * | 10/2012 | Beaty ................... | G06F 9/4856 718/1 |
| 8,671,407 B2 | 3/2014 | Ballani et al. | |
| 8,775,438 B1 * | 7/2014 | Brooker ............... | G06F 9/5027 707/748 |

(Continued)

OTHER PUBLICATIONS

U.S. Appl. No. 14/663,282, filed Mar. 19, 2015, Christopher Magee Greenwood, et al.

(Continued)

*Primary Examiner* — David R Lazaro
*Assistant Examiner* — Julian Chang
(74) *Attorney, Agent, or Firm* — Robert C. Kowert; Kowert, Hood, Munyon, Rankin & Goetzel, P.C.

(57) ABSTRACT

A distributed system may implement optimizing for infrastructure diversity in resource placement. A placement request for a resource to be placed at one of multiple resource hosts respectively implemented at infrastructure units may be received. An evaluation of utilization data for the multiple resource hosts may be performed with regard to an infrastructure diversity constraint for placing resources at the infrastructure units. A selection of a resource host may be made based on the evaluation of the utilization data according to the infrastructure diversity constraint. In some embodiments to select the resource host, the effect of placing the resource on candidate resource hosts on an infrastructure-diverse capacity metric may be determined to score the candidate resource hosts. The resource may be placed at the selected resource host.

20 Claims, 7 Drawing Sheets

(56) References Cited

U.S. PATENT DOCUMENTS

| | | | |
|---|---|---|---|
| 8,924,392 B2 | 12/2014 | Dutta et al. | |
| 9,246,996 B1* | 1/2016 | Brooker | H04L 67/1008 |
| 9,503,517 B1* | 11/2016 | Brooker | H04L 67/1008 |
| 2005/0228618 A1 | 10/2005 | Patel et al. | |
| 2006/0095711 A1* | 5/2006 | Aridor | G06F 9/5061 |
| | | | 712/15 |
| 2006/0168154 A1* | 7/2006 | Zhang | G06F 11/1662 |
| | | | 709/220 |
| 2007/0156842 A1* | 7/2007 | Vermeulen | G06F 17/30212 |
| | | | 709/217 |
| 2007/0300239 A1* | 12/2007 | Adam | G06F 9/505 |
| | | | 719/320 |
| 2008/0172673 A1* | 7/2008 | Naik | G06F 9/505 |
| | | | 718/104 |
| 2008/0184250 A1* | 7/2008 | Hamadi | G06F 9/5038 |
| | | | 718/104 |
| 2009/0172191 A1* | 7/2009 | Dumitriu | H04L 67/1029 |
| | | | 709/241 |
| 2009/0210527 A1* | 8/2009 | Kawato | G06F 9/45558 |
| | | | 709/224 |
| 2009/0324222 A1* | 12/2009 | Kunjidhapatham | H04L 45/02 |
| | | | 398/58 |
| 2010/0161805 A1 | 6/2010 | Yoshizawa et al. | |
| 2010/0325281 A1* | 12/2010 | Li | G06F 17/30575 |
| | | | 709/226 |
| 2010/0332401 A1* | 12/2010 | Prahlad | G06F 17/3002 |
| | | | 705/80 |
| 2011/0004735 A1* | 1/2011 | Arroyo | G06F 9/455 |
| | | | 711/162 |
| 2011/0131569 A1* | 6/2011 | Heim | G06F 9/45558 |
| | | | 718/1 |
| 2011/0131570 A1* | 6/2011 | Heim | G06F 9/45558 |
| | | | 718/1 |
| 2011/0173329 A1* | 7/2011 | Zhang | G06F 1/3206 |
| | | | 709/226 |
| 2011/0213911 A1* | 9/2011 | Eidus | G06F 9/5033 |
| | | | 711/6 |
| 2011/0219372 A1* | 9/2011 | Agrawal | G06F 9/45558 |
| | | | 718/1 |
| 2011/0307291 A1* | 12/2011 | Rolia | G06Q 10/06 |
| | | | 705/7.25 |
| 2011/0307899 A1* | 12/2011 | Lee | G06F 9/5027 |
| | | | 718/104 |
| 2012/0079097 A1* | 3/2012 | Gopisetty | G06F 9/5083 |
| | | | 709/224 |
| 2012/0131594 A1* | 5/2012 | Morgan | G06F 9/5072 |
| | | | 718/105 |
| 2012/0221624 A1* | 8/2012 | Gerstel | H04L 45/02 |
| | | | 709/203 |
| 2012/0284408 A1* | 11/2012 | Dutta | G06F 9/5066 |
| | | | 709/226 |
| 2013/0007219 A1* | 1/2013 | Sorenson, III | H04L 67/1095 |
| | | | 709/219 |
| 2013/0111033 A1* | 5/2013 | Mao | G06F 9/5072 |
| | | | 709/226 |
| 2013/0145203 A1* | 6/2013 | Fawcett | G06F 9/5061 |
| | | | 714/3 |
| 2013/0151681 A1* | 6/2013 | Dournov | G06F 8/67 |
| | | | 709/223 |
| 2013/0185229 A1* | 7/2013 | Naga | G06F 12/123 |
| | | | 705/418 |
| 2013/0185667 A1* | 7/2013 | Harper | G06F 11/0709 |
| | | | 715/772 |
| 2013/0198740 A1* | 8/2013 | Arroyo | H04L 41/0806 |
| | | | 718/1 |
| 2013/0212285 A1* | 8/2013 | Hoffmann | H04L 12/4641 |
| | | | 709/226 |
| 2013/0219066 A1* | 8/2013 | Arroyo | G06F 9/5077 |
| | | | 709/226 |
| 2013/0219068 A1* | 8/2013 | Ballani | G06F 9/5061 |
| | | | 709/226 |
| 2013/0227558 A1* | 8/2013 | Du | G06F 9/45558 |
| | | | 718/1 |
| 2013/0263120 A1* | 10/2013 | Patil | G06F 9/45558 |
| | | | 718/1 |
| 2013/0275669 A1* | 10/2013 | Naga | G06F 12/0866 |
| | | | 711/113 |
| 2013/0311628 A1* | 11/2013 | Kruglick | G06F 8/61 |
| | | | 709/223 |
| 2013/0322427 A1* | 12/2013 | Stiekes | H04L 49/356 |
| | | | 370/352 |
| 2014/0059178 A1* | 2/2014 | Dutta | H04L 41/0883 |
| | | | 709/219 |
| 2014/0059207 A1* | 2/2014 | Gulati | G06F 9/505 |
| | | | 709/224 |
| 2014/0082167 A1* | 3/2014 | Robinson | G06F 11/1458 |
| | | | 709/223 |
| 2014/0136684 A1* | 5/2014 | Jain | H04L 41/069 |
| | | | 709/224 |
| 2014/0136690 A1* | 5/2014 | Jain | H04L 41/5022 |
| | | | 709/224 |
| 2014/0223576 A1* | 8/2014 | Zhao | H04L 63/10 |
| | | | 726/27 |
| 2014/0258450 A1 | 9/2014 | Suryanarayanan et al. | |
| 2014/0317265 A1* | 10/2014 | James | H04L 67/1004 |
| | | | 709/224 |
| 2014/0317701 A1* | 10/2014 | Eicken | H04L 67/1097 |
| | | | 726/5 |
| 2015/0067169 A1* | 3/2015 | Povolny | H04L 47/781 |
| | | | 709/226 |
| 2015/0088586 A1* | 3/2015 | Pavlas | G06F 9/45558 |
| | | | 705/7.25 |
| 2015/0095466 A1* | 4/2015 | Pithewan | H04L 41/0803 |
| | | | 709/220 |
| 2015/0134827 A1* | 5/2015 | Shah | H04L 61/1535 |
| | | | 709/226 |
| 2015/0135176 A1* | 5/2015 | Kruglick | G06F 9/45533 |
| | | | 718/1 |
| 2015/0149620 A1* | 5/2015 | Banerjee | H04L 41/14 |
| | | | 709/224 |
| 2015/0163157 A1* | 6/2015 | Hao | H04L 47/70 |
| | | | 709/226 |
| 2015/0169291 A1* | 6/2015 | Dube | G06F 8/20 |
| | | | 717/101 |
| 2015/0193245 A1* | 7/2015 | Cropper | G06F 9/45533 |
| | | | 718/1 |
| 2015/0200872 A1* | 7/2015 | Huang | G06N 7/005 |
| | | | 709/226 |
| 2015/0212840 A1* | 7/2015 | Biran | G06F 9/45558 |
| | | | 718/1 |
| 2015/0244716 A1* | 8/2015 | Potlapally | H04L 63/064 |
| | | | 713/155 |
| 2015/0248305 A1* | 9/2015 | Shu | G06F 9/45558 |
| | | | 718/1 |
| 2015/0263890 A1* | 9/2015 | Fall | G06F 9/45558 |
| | | | 709/226 |
| 2015/0269161 A1* | 9/2015 | Bhagavan | G06F 17/3053 |
| | | | 707/776 |
| 2015/0269239 A1* | 9/2015 | Swift | G06F 17/30575 |
| | | | 707/610 |
| 2015/0277789 A1* | 10/2015 | White | G06F 3/0619 |
| | | | 711/114 |
| 2015/0286493 A1* | 10/2015 | Dafni | G06F 9/45558 |
| | | | 718/1 |
| 2015/0317142 A1* | 11/2015 | Herger | G06F 17/30958 |
| | | | 717/176 |
| 2015/0324182 A1* | 11/2015 | Barros | G06F 8/61 |
| | | | 717/174 |
| 2015/0356087 A1* | 12/2015 | Alvino | G06F 17/3053 |
| | | | 707/728 |
| 2016/0019123 A1* | 1/2016 | Parra | G06F 11/0709 |
| | | | 714/19 |
| 2016/0080495 A1* | 3/2016 | Bilas | H04L 67/1097 |
| | | | 709/224 |
| 2016/0085579 A1* | 3/2016 | Machida | G06F 9/5027 |
| | | | 718/1 |

(56) References Cited

U.S. PATENT DOCUMENTS

| | | | | |
|---|---|---|---|---|
| 2016/0124735 A1* | 5/2016 | Dingsor | .................... | G06F 8/60 |
| | | | | 717/177 |
| 2016/0127200 A1* | 5/2016 | Dippenaar | .......... | H04L 41/5051 |
| | | | | 709/224 |
| 2016/0269313 A1* | 9/2016 | Brooker | ................ | G06F 9/5072 |
| 2016/0323182 A1* | 11/2016 | Segal | ...................... | H04L 45/56 |
| 2017/0013046 A1* | 1/2017 | Flynn | ...................... | H04L 67/06 |
| 2017/0031714 A1* | 2/2017 | Stone | ................. | G06F 9/45533 |
| 2017/0163661 A1* | 6/2017 | Lazri | ................... | H04L 63/1408 |

OTHER PUBLICATIONS

Yuval Rochman, Hanoch Levy, Eli Brosh, "Efficient resource placement in cloud computing and network applications", SIGMETRICS Performance Evaluation Review 42(2), 2014, pp. 49-51.

Yuval Rochman, Hanoch Levy, Eli Brosh, "Resource placement and assignment in distributed network topologies" INFOCOM, 2013, pp. 1914-1922.

\* cited by examiner

US 10,505,862 B1

OPTIMIZING FOR INFRASTRUCTURE DIVERSITY CONSTRAINTS IN RESOURCE PLACEMENT

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different infrastructure configurations and/or constraints may be implemented in order to provide performance guarantees. When creating new block-based storage resources, navigating the different infrastructure configurations and/or constraints to place new storage may prove challenging.

Figure 1A:
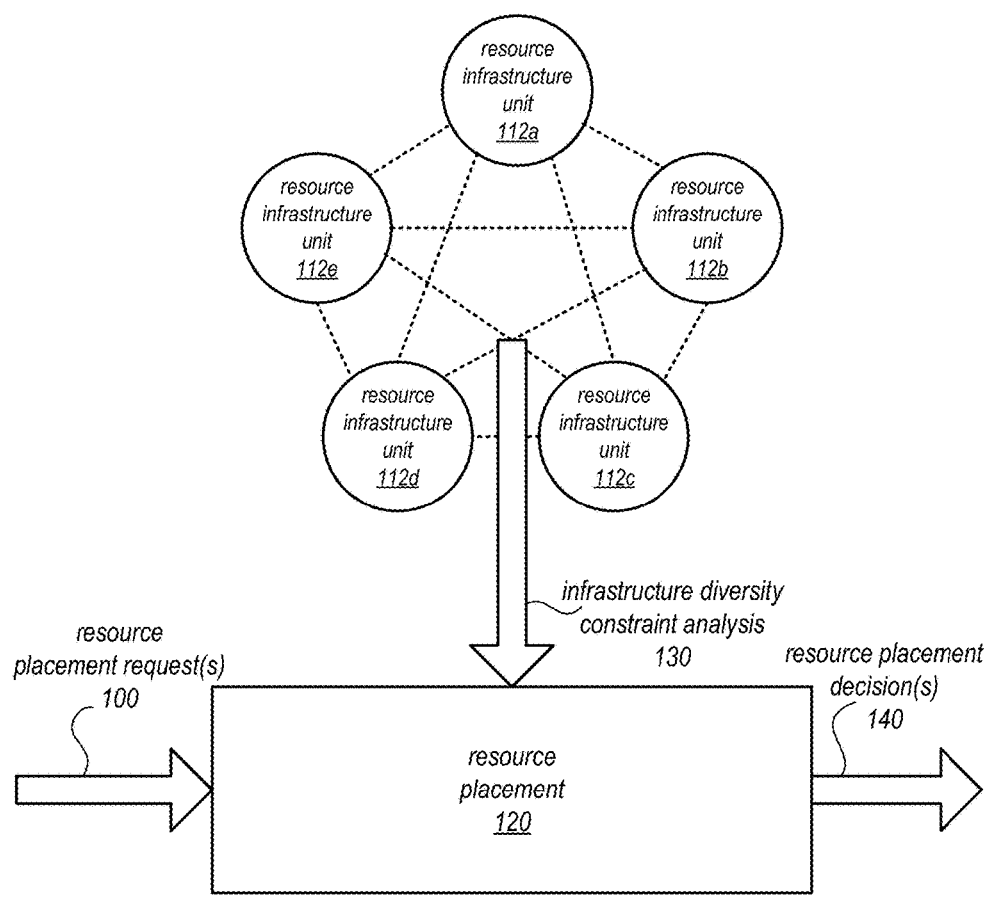
FIG. 1A illustrates a logical block diagram for optimizing for infrastructure diversity constraints in resource placement, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement optimizing for infrastructure diversity constraints in resource placement. Distributed systems may host various resources for performing or implementing different systems, services, applications and/or functions. Resources may be one of many different types of resources hosted at a resource host of a distributed system, such as one of various types of physical or virtualized computing resources, storage resources, or networking resources. For example, a storage service may host different replicas of data across a number of different resource hosts. In order to provide availability and durability characteristics for the resources implemented in these distributed system, infrastructure diversity constraints may be enforced. Infrastructure diversity constraints may help to avoid common failure and other performance scenarios which may reduce the availability and/or durability of resources. For instance, infrastructure diversity constraints may protect, enhance, optimize or support associated resources, such as different replicas of a resource, resources working together, resources dependent on other resources, or any other resource relationship. In one such example, the storage service may implement an infrastructure diversity constraint to host the different replicas of data at different hosts on different server racks (as resource hosts (e.g., servers) on the same server rack may typically experience common failures).

When placing resources at resource hosts, infrastructure diversity constraints may be enforced. When viewed in isolation, for any given resource to be placed, multiple different resource hosts may satisfy the infrastructure diversity requirement for the resource. In the example of the server rack diversity constraint given above, a single replica of a resource may be placed in multiple different server racks that are diverse from another server rack holding another replica of the resource. When viewed in isolation, the decision to choose a particular sever rack that satisfies the server rack diversity constraint is simple. However, the effect of any one resource placement on the future capacity to place resources at other hosts in accordance with an infrastructure diversity constraint often goes unaccounted for. For example, if the example diversity constraint described above requires two replicas on resource hosts on different server racks, then consider the scenario where a single server rack with a large available capacity exists and other server racks have little to no available capacity. Even though large capacity exists on the one rack, very few resources could be placed as no other racks could be used to meet the infrastructure diversity constraint of multiple racks. However, if during the placement of resources, the effect of placement on diversity constraints were accounted for, then this scenario might not be reached, as forward-looking placement decisions may be made to maximize the number of possible resource placements remaining that still satisfy an infrastructure diversity constraint.

FIG. 1A illustrates a logical block diagram for optimizing for infrastructure diversity constraints in resource placement, according to some embodiments. Resource placement 120 may provide placement decision making for placing resources at different resource hosts of a distributed system. Resource hosts, which may be one or more computing systems, nodes, or devices (e.g., system 1000 in FIG. 7 below) may be configured to host or implement a resource of the distributed system. Infrastructure units, 112a, 112b, 112c, 112d, and 112, such as server racks, networking switches, routers, or other components, power supplies (or other resource host suppliers), or physical or logical localities (e.g., locations in a particular row, room, building, data center, fault tolerant zone, etc.) may be utilized to implement resource hosts.

Figure 1B:
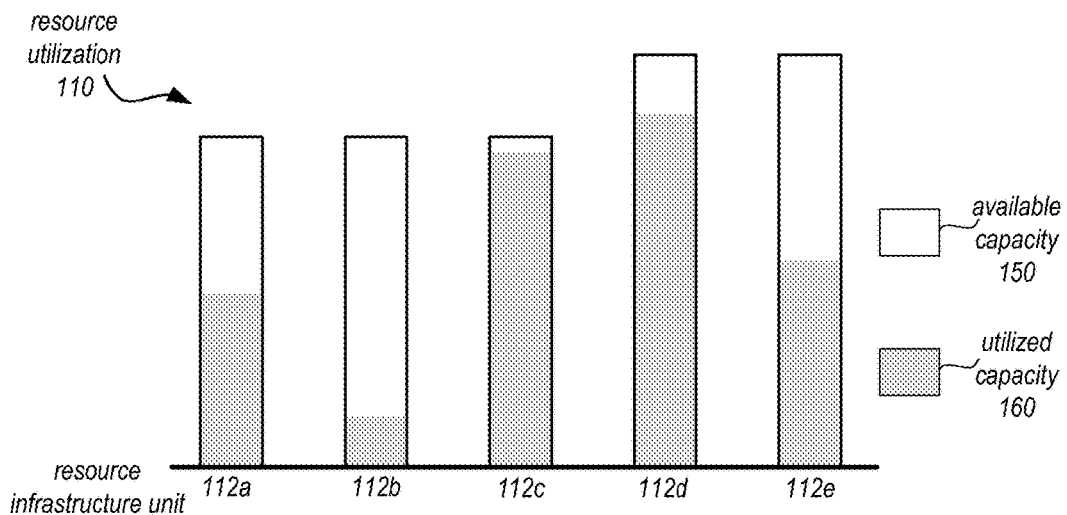
FIG. 1B illustrates a diagram indicating resource utilization for resource infrastructure units, according to some embodiments.

In response to resource placement request(s) 100, resource placement 120 may evaluate resource utilization data 110 for resource hosts according to an infrastructure diversity constraint for placing resources with regard to resource infrastructure units 112, performing an infrastructure diversity constraint analysis 130. As noted above, an infrastructure diversity constraint may require a resource placed at resource host implemented at one infrastructure unit to have another associated resource, such as a replica, copy, related, dependent, or otherwise corresponding resource placed at resource host(s) implemented at different infrastructure unit(s). For instance, a resource that is a data volume may have an infrastructure diversity requirement that requires a resource be placed at three (or more) different infrastructure units (e.g., three copies of a data volume placed at resources hosts implemented at different server racks). In some embodiments, the possible placements that satisfy an infrastructure diversity constraint may be represented and analyzed as a k-partite graph. For instance, FIG. 1A, illustrates the possible pairings along the dotted lines between each resource infrastructure unit 112, which may illustrate a 5 node partite graph. The infrastructure diversity constraint may be evaluated by reducing from maximal groups or pairings of infrastructure units in the 5-partite graph. For example, FIG. 1B illustrates a diagram indicating resource utilization for resource infrastructure units, according to some embodiments. Available capacity 150 and utilized capacity 160, for resource hosts implemented at infrastructure units 112 is shown. The utilization data 110 may be evaluated with respect to an infrastructure diversity constraint for placing a resource at a resource host implemented at one of the infrastructure units 112. For example, a resource may utilize enough capacity so that only a resource host at infrastructure units 112a, 112b, or 112e may host the resource.

Infrastructure diversity constraint analysis 130 may be performed to determine a capacity for placing resources among the resource hosts while satisfying an infrastructure diversity constraint. For example, an infrastructure-diverse capacity metric may be generated which indicates how many resources can be placed based on the available capacity 150 of resource hosts at infrastructure units 112. A selection may be made based the infrastructure diversity constraint analysis 130 to make resource placement decision(s) 140, in some embodiments. For example, a score may be generated for candidate resource hosts, which indicates the effect of placement of the resource on the candidate resource host upon the infrastructure-diverse capacity metric (as discussed below with regard to FIG. 6). In this way, placement decisions may be made so as to optimize the effect of placements on remaining capacity for the infrastructure diversity constraint. For example, resource placements may be avoided on resources implemented for resource infrastructure unit 112d, as consuming further capacity may prevent the infrastructure unit from providing the required infrastructure unit diversity for future resource placements.

Please note that previous descriptions are not intended to be limiting, but are merely provided as an example of optimizing for infrastructure diversity in resource placement. Various other components may instigate or participate in infrastructure diversity constraint analysis and/or resource placement decisions. Other differences, for example, such as the number of resource infrastructure units, or capacity may also be different than illustrated in FIGS. 1A and 1B.

This specification begins with a general description of a provider network, which may implement optimizing for infrastructure diversity constraints in resource placement for resources offered via one or more network-based services in the provider network, such as data volumes offered via a block-based storage service. Then various examples of a block-based storage service are discussed, including different components/modules, or arrangements of components/module that may be employed as part of volume placement for data volumes in the block-based storage service. A number of different methods and techniques to implement optimizing for infrastructure diversity constraints in resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
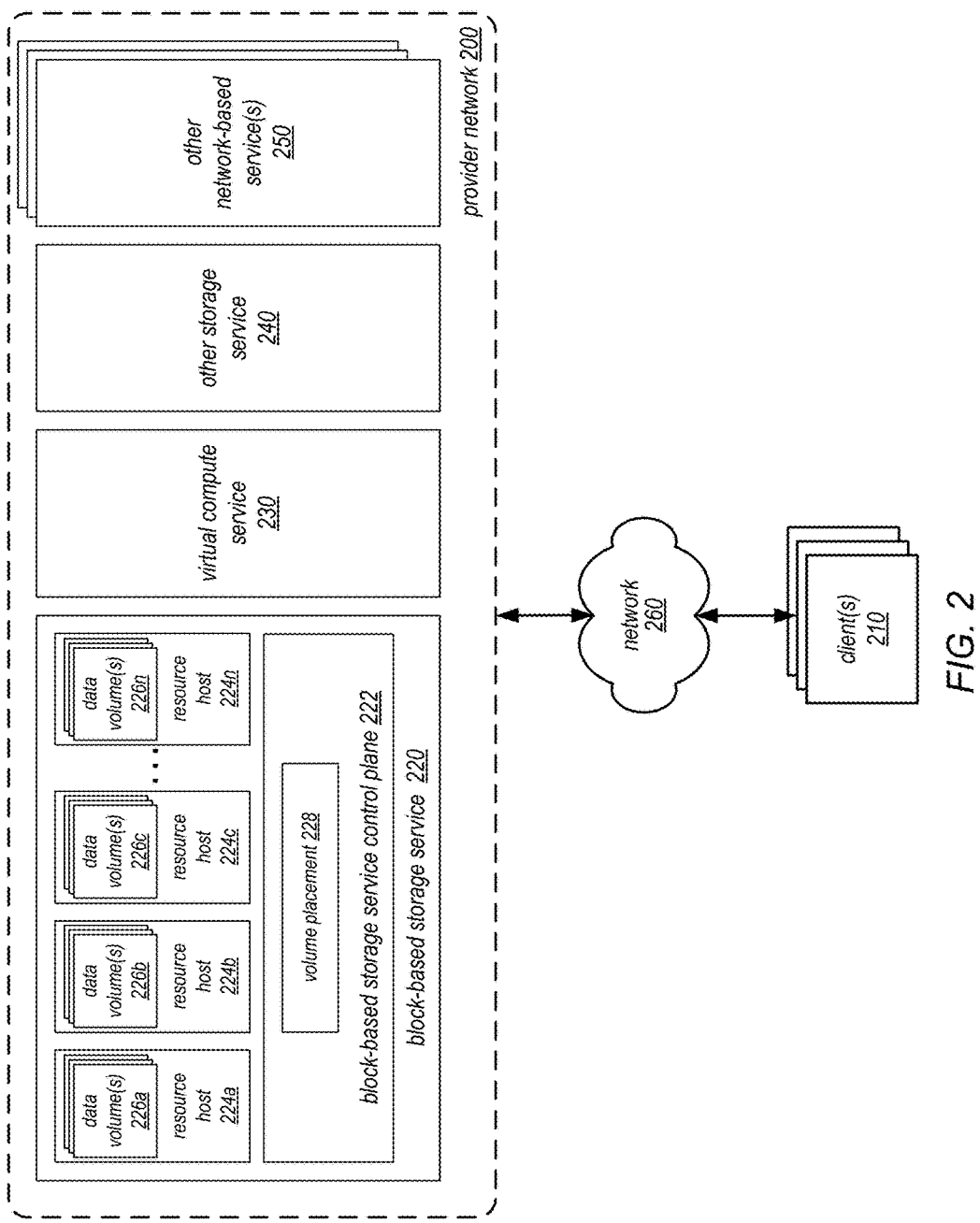
FIG. 2 is a block diagram illustrating a provider network implementing multiple network-based services including a block-based storage service that implements optimizing for infrastructure diversity constraints in resource placement, according to some embodiments.

FIG. 2 is a block diagram illustrating a provider network implementing multiple network-based services including a block-based storage service that implements optimizing for infrastructure diversity constraints in resource placement, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of other resources, such as particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for providing storage resources and performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane may implement volume placement 228, such as described in further detail below with regard to FIG. 4. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
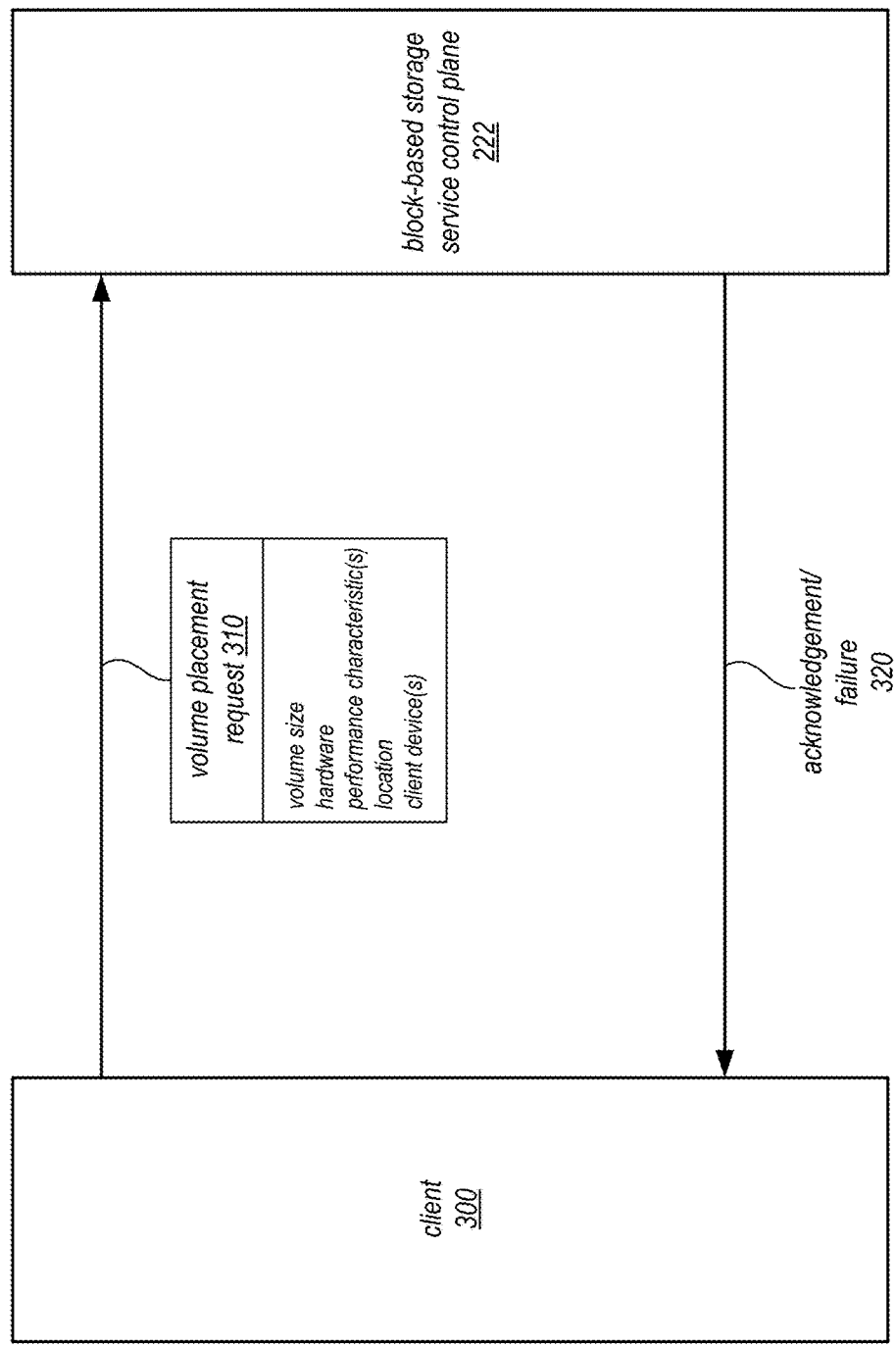
FIG. 3 is a block diagram illustrating a volume placement request for a block-based storage service, according to some embodiments.

FIG. 3 is a block diagram illustrating a volume placement request for a block-based storage service, according to some embodiments. Volume placement requests may occur as a result of a request to create a new volume, (e.g., to place a new master/slave replica) or to move a currently existing volume from a current resource host to a new resource host. As illustrated in FIG. 3, various information about the volume placement request 310 may be provided from a client 300 (which may be an external client 210 or other internal system, component, service or device). For example, in some embodiments a request 310 may a request from some component internal to or within the control plane for a service, either for the block-based storage service itself (in which case the request may directed specifically to a placement manager, such as volume placement 228). Volume placement request 310 may include various information about the volume to place, including the volume size, hardware (e.g., SSD or HDD), performance characteristics (e.g., number of IOPs), location (e.g., data center, fault tolerant zone), and/or client devices accessing the volume. For instance, in some embodiments, a data volume may be placed to serve as virtual block storage for a virtual compute instance, such as may be provided by virtual computing service 230 in FIG. 2 discussed above. The placement request may identify the particular virtual compute instance to which the data volume is "attached" or otherwise providing virtual block storage. In some embodiments, request 310 may identify a logical group or association within which the resource may be placed (e.g., particular resource hosts/infrastructure units mapped to the logical group may be identified). As discussed in detail below, the volume placement request may succeed or fail, with the appropriate acknowledgement or failure 320 sent in return.

Figure 4:
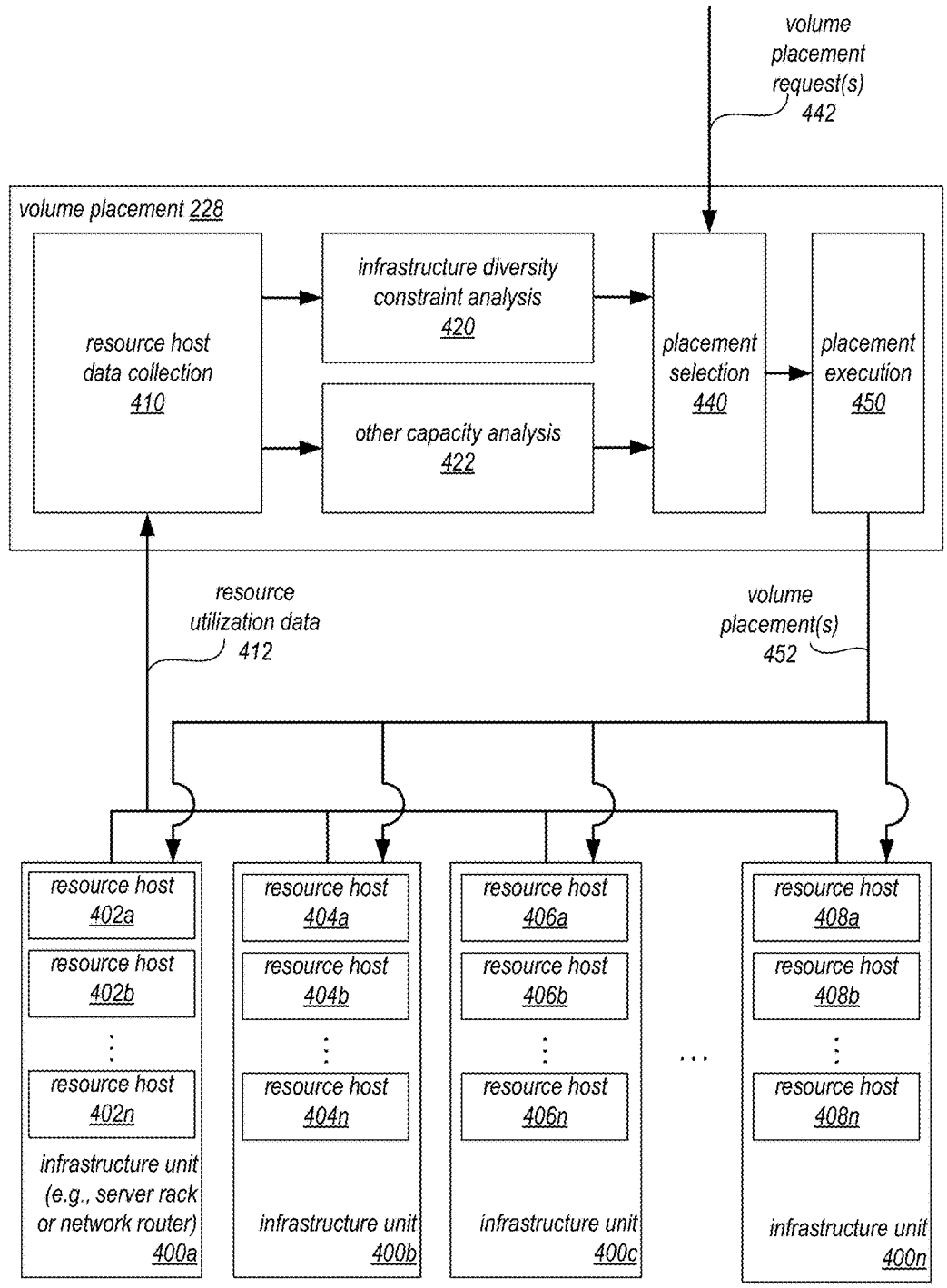
FIG. 4 is a block diagram logically illustrating a volume placement component that implements optimizing for infrastructure diversity constraints, according to some embodiments.

FIG. 4 is a block diagram logically illustrating a volume placement component that implements optimizing for infrastructure diversity constraints, according to some embodiments. As noted above, multiple resource hosts, such as resource hosts 402, 404, 406, and 408, may be implemented in order to provide block-based storage services. A resource host may be one or more computing systems or devices, such as a storage server or other computing system (e.g., computing system 1000 described below with regard to FIG. 7). Each resource host may maintain respective replicas of data volumes. Some data volumes may differ in size from other data volumes, in some embodiments. Resource hosts may also provide multi-tenant storage. For example, in some embodiments, resource host 406a may maintain a data volume for one account of block-based storage service 220, while another data volume maintained at resource host 406a may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, resource host 402a may serve as a master resource host. A master resource host may, in various embodiments, receive and process requests (e.g., I/O requests) from clients of the data volume. Thus, resource host 402a may then coordinate replication of I/O requests, such as write requests, or any other changes or modifications to the data volume to one or more other resource hosts serving as slave resource hosts. For instance, resource host 408b may maintain a replica of the data volume maintained at resource host 402a. Thus, when a write request is received for the data volume at resource host 402a, resource host 402a may forward the write request to resource host 408b and wait until resource host 408b acknowledges the write request as complete before completing the write request at resource host 402a. Master resource hosts may direct other operations for data volumes, like snapshot operations or other I/O operations (e.g., serving a read request). In various embodiments, infrastructure diversity constraints may be implemented as requirements for master and slave(s) of a data volume, such as a requirement for server rack diversity between a resource host that implements a master and resource hosts that implement slave(s).

Please note, that in some embodiments, the role of master and slave resource hosts may be assigned per data volume. For example, for a data volume maintained at resource host 402b, resource host 402b may serve as a master resource host. While for another data volume maintained at resource host 402b, resource host 402b may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

As illustrated in FIG. 4, resource hosts may be implemented at different infrastructure units 400. Infrastructure units 400, such as server racks, networking switches, routers, or other components, power supplies (or other resource host suppliers), or physical or logical localities (e.g., locations in a particular row, room, building, data center, fault tolerant zone, etc.) may be utilized to implement resource hosts for block-based storage service 220. For example, in some embodiments infrastructure units may be server racks (e.g., infrastructure unit 400a is a server rack and resource hosts 402a through 402n are located at server rack 400a, infrastructure unit 400b is a server rack and resource hosts 404a through 404n are located at server rack 400b, infrastructure unit 400c is a server rack and resource hosts 406a through 406n are located at server rack 400c, and infrastructure unit 400n is a server rack and resource hosts 408a through 408n are located at server rack 400n). Resource hosts may be implemented at, located at, associated or grouped with multiple different infrastructure units (e.g., located at a particular server rack, in a particular data center, connected to a particular network brick or router, etc.).

Resource infrastructure diversity constraints may be constraints that require diversity between related resources (e.g., master and slave replicas of a data volume) at different infrastructure units. For example, a diversity constraint in some embodiments may require that a master replica be implemented at a resource host located at a different server rack (e.g., host 402a at rack 400a) than a server rack for slave replica(s) (e.g., host 406a at rack 400c). In some embodiments, infrastructure diversity constraints may be determined based on common failure scenarios or characteristics (e.g., hosts commonly fail on the same server rack, network brick/router, data center, room, etc.). Infrastructure diversity constraints may also provide for different levels of durability (e.g., number of replicas) and/or availability (e.g., location of replicas in diverse infrastructure units). Please note that while infrastructure units 400 are depicted as having equal numbers of resource hosts, the number or type of resource hosts may vary from infrastructure unit 400 to other infrastructure unit 400.

Block-based storage service control plane 222 may implement volume placement 228, in various embodiments. Volume placement 228 may be implemented at one or more computing nodes, systems, or devices (e.g., system 1000 in FIG. 7). In at least some embodiments, volume placement 228 may implement resource host data collection 410 to collect information, metrics, metadata, or any other information for performing volume placement. For instance, as illustrated in FIG. 4, resource utilization data for the resource hosts 412 may be received. In some embodiments, resource host data collection 410 may aggregate the data according to infrastructure unit 400 (e.g., aggregate utilization data for resource hosts 402a through 402n for infrastructure unit 400a, and so on). In some embodiments, resource utilization data may be collected and/or aggregated according to logical groups in which resources belong (e.g., user created or service defined logical groups of resources). Resource host data collection 410 may periodically (or aperiodically) poll, sweep, request, or otherwise obtain updated resource utilization data 412 from resource hosts.

Figure 5:
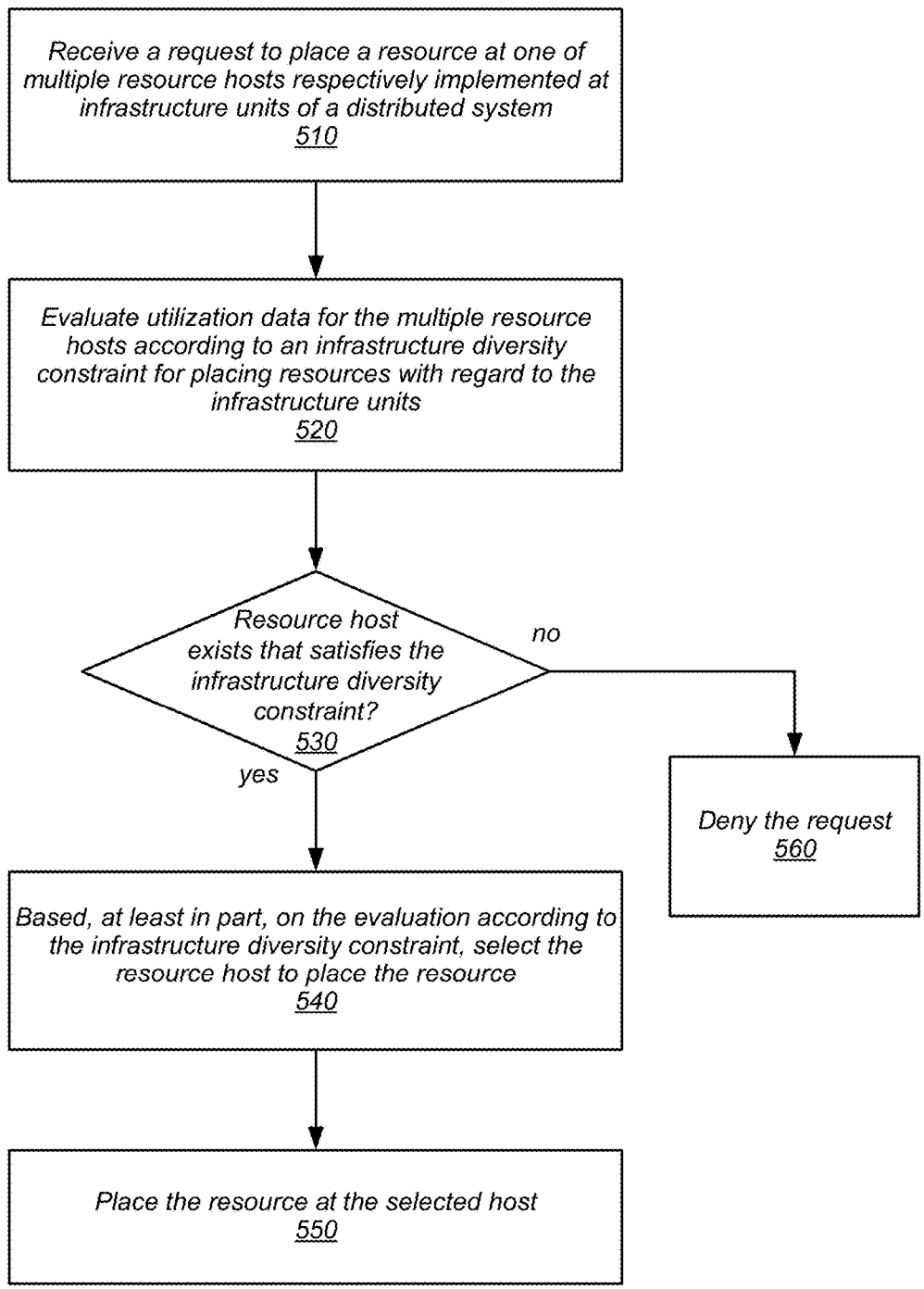
FIG. 5 is a high-level flowchart illustrating various methods and techniques for optimizing for infrastructure diversity constraints in resource placement, according to some embodiments.

Volume placement 228 may, in various embodiments, implement infrastructure diversity constraint analysis 420 to evaluate utilization data for the resource hosts to according to an infrastructure diversity constraint, such as discussed below with regard to FIGS. 5 and 6. Volume placement 228 may also implement other capacity analysis 422 to examine utilization data, such as available storage space, throughput capacity (IOPs), last time resource host contacted, storage space fragmentation, software/hardware configuration, etc. Placement selection 440 may be implemented to make selections based on the evaluation of the utilization data according to a diversity constraint analysis (e.g., according to the scoring technique described below with regard to FIG. 6) in response to placement requests 442. Placement decisions may then be made and placement execution 450 may be implemented to direct volume placement(s) 452 at resource hosts.

The examples of optimizing for infrastructure diversity constraints in resource placement discussed above with regard to FIGS. 2-4 have been given in regard to a block-based storage service and/or other network-based services. Various other types or configurations of distributed systems placing resources at resource hosts may implement these techniques. For example, a backup or archive distributed storage system may determine placements for new data to archive or backup according to an infrastructure diversity constraint which may provide a certain level of durability for the new data. Different configurations of the various modules, components, systems, and or services described above that may implement optimizing for infrastructure diversity constraints in resource placement may be configured to evaluate utilization data for resource hosts according to an infrastructure diversity constraint and select placements of resources according to the evaluation. FIG. 5 is a high-level flowchart illustrating various methods and techniques for optimizing for infrastructure diversity constraints in resource placement, according to some embodiments. These techniques may be implemented using a control plane, resource placement manager or other component for placing resources at resource hosts in a distributed system, as described above with regard to FIGS. 2-4.

As indicated at 510, a request to place a resource at one of multiple resources respectively implemented at infrastructure units of a distributed system may be received, in various embodiments. For instance, the request may be received as part of a (or in response to) creation or other similar request to place a new resource at one of the resource hosts. In another example, the request may be received to place an already existing resource at one of the multiple resource hosts (or another resource host—e.g., from a system, node, or device external to the multiple resources, such as another data center, network, organization, and/or entity). The request may be received via an interface which may be of various types, including graphical and/or programmatic interfaces from a client of a distributed system, or other component, system, service, or device internal to the distributed system.

The resource may be one of many different types of resources hosted at a resource host, such as one of various types of physical or virtualized computing resources, storage resources, or networking resources. The request to place the resource may, in various embodiments, indicate different resource characteristics, type, and/or other requirement information for placing the resource, such as the various information described above with regard to FIG. 3. Resource hosts may be systems, components, or devices, such as system 1000 described below with regard to FIG. 7, may be configured to host the resource as part of the distributed system. Infrastructure units, such as server racks, networking switches, routers, or other components, power supplies (or other resource host suppliers), or physical or logical localities (e.g., locations in a particular row, room, building, data center, fault tolerant zone, etc.) may be utilized to implement resource hosts. As discussed above, with regard to FIG. 4, utilization data may be collected, tracked, monitored, stored, and/or otherwise maintained for the resource hosts, which may indicate the utilization of the resource host for current resources hosted at the resource host. The utilization data may be aggregated or calculated according to the one or more resource hosts implemented at an infrastructure unit (e.g., servers located at a server rack or servers connected to a network router).

An evaluation of utilization data for the multiple resources may be performed according to an infrastructure diversity constraint for placing resources with regard to the infrastructure units, as indicated at 520, in various embodiments. As discussed above, an infrastructure diversity constraint may require a resource placed at resource host implemented at one infrastructure unit to have an associated resource, such as a replica, copy, related, dependent, or otherwise corresponding resource placed at resource host(s) implemented at different infrastructure unit(s). For instance, a resource that is a data volume may have an infrastructure diversity requirement that requires a resource be placed at two (or more) different infrastructure units (e.g., two copies of a data volume placed at resources hosts implemented at different server racks). Diversity constraints may be defined to provide various different qualities or characteristics for resources, such as durability and/or availability.

The evaluation of the utilization data may be performed to understand the effect of placing a resource at a resource host upon available capacity to place other resources on resource hosts that satisfy the infrastructure diversity constraint. For example, the evaluation may be performed to determine a metric, such as an infrastructure diverse resource capacity metric, which indicates the capacity to place resources among evaluated resource hosts. Consider the data volume example described above. The evaluation may determine a metric which indicates the number of data volumes which may be placed among resource hosts (e.g., in a particular data center, fault tolerant zone or other group of resource hosts) satisfying an infrastructure diversity constraint for placing the data volumes (e.g., 2 copies of the data volume at different server racks). In some embodiments the evaluation may be performed by reducing from maximal groups or pairings of infrastructure units in a k-partite graph, where k is the number of infrastructure units and each node in the graph is the capacity of a resource host to host a resource. In the data volume example above, k may be the number of server racks and each node in the graph may be the largest data volume a resource host can support. Please note that the previous example of an evaluation is not intended to be limiting. Numerous other evaluations of the utilization data according to an infrastructure diversity constraint may be performed, such as identifying those resource hosts that provide multiple different placement scenarios for resources to satisfy the diversity infrastructure constraint.

In at least some embodiments, the evaluation of utilization data may be performed according to different resource types (e.g., different types of computing resources, storage volumes, network resources, etc.) providing placement capacity for each type according to the same or different infrastructure diversity constraints. For instance, a metric in the above example may indicate how many 1 Terabyte data volumes may be placed that satisfy the two copies of the data volume at different server racks. Another metric may be determined for the number of 500 Gigabyte data volumes may be placed that satisfy the two copies of the data volume at different server racks. In at least some embodiments, the evaluation may be performed according to the type and/or other characteristics of the resource to be placed (e.g., evaluate for 1 Terabyte data volumes in response to a 1 Terabyte data volume placement request or evaluate for 10 Gigabyte data volumes in response to a 7 Gigabyte data volume request).

As indicated at 530, if no resource host exists that satisfies the diversity constraint, then as indicated at 560, the placement request may be denied. If, as indicated by the positive exit from 530, a resource host exists that satisfies the diversity infrastructure constraint (e.g., a resource host exists that is implemented at a different infrastructure unit than the infrastructure unit of a resource host implementing another copy, replica, dependent, or otherwise corresponding resource), then a placement may be performed.

Based, at least in part, on the evaluation of the utilization data for the multiple resource hosts according to the infrastructure diversity constraint, a selection of the resource host to place the resource may be made, as indicated at 540, in various embodiments. For example, as indicated above resource hosts may be identified according to the evaluation 520, and a resource host that provides the most placement options for another resource that is a copy, replica, dependent on, or corresponding to the resource may be selected to place the resource. In at least some embodiments, a scoring technique, such as described below with regard to FIG. 6, may be implemented to select the resource host. As indicated at 550, the resource may then be placed at the selected resource host. For example, data may be transferred to the selected resource host, configuration operations may be performed at the resource host, or any other actions taken to host the resource at the resource host. In some embodiments, multiple resource hosts may be selected and tried for placement until the resource is successfully placed at one of the selected resource hosts. Resource utilization data may be updated based on the placement, in some embodiments.

The evaluation of utilization data according to an infrastructure diversity constraint may expose hidden downsides for certain placement options for resources in resource hosts of a distributed system. For instance, as noted earlier, if resource utilization is not evenly distributed, some resource hosts with available capacity may be implemented at infrastructure units for which there are few other diverse pairs or groups of infrastructure units with resources hosts with available capacity sufficient to satisfy an infrastructure diversity constraint. Different ways of selecting resource hosts for placing resources may differently account for potential negative effects of resource placements. A scoring, or weighting schema, such as discussed below with regard to FIG. 6, may be implemented to assess the impact of resource placement on available capacity in light of an infrastructure diversity constraint for placing the resource. However, other selection techniques based on the evaluation of the utilization data according to an infrastructure diversity constraint may be implemented, such as filtering out resource hosts according to the evaluation (e.g., in order to identify those resource hosts which do not provide a certain number of possible infrastructure diversity scenarios for resource placement), and thus following discussion is not intended to be limiting.

Figure 6:
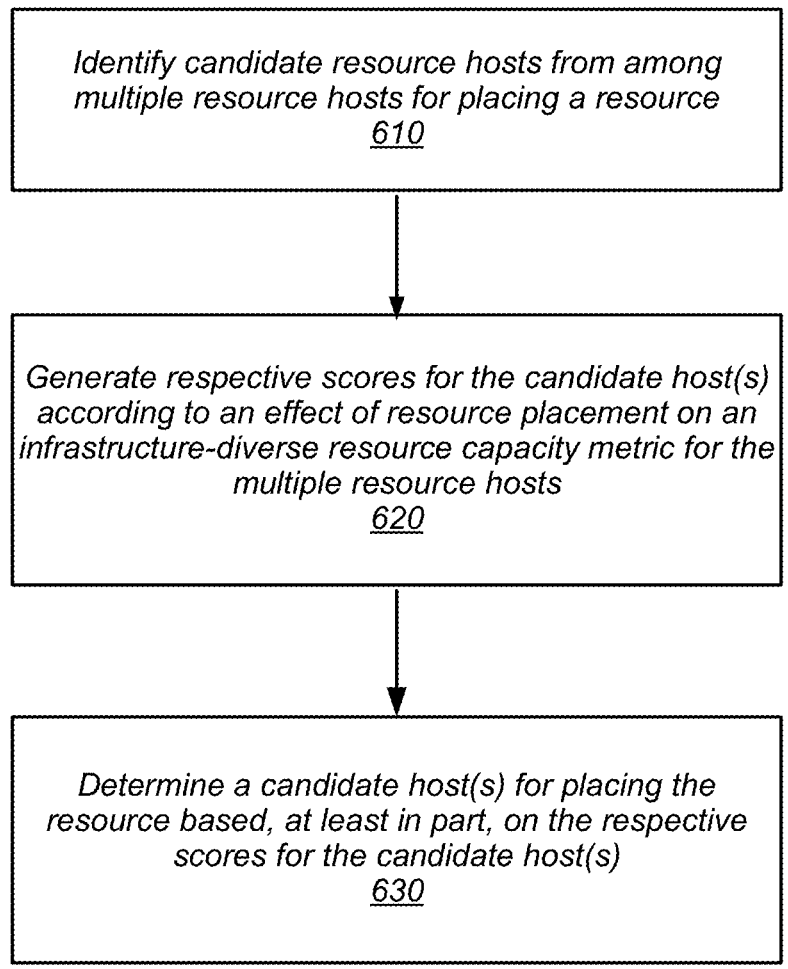
FIG. 6 is a high-level flowchart illustrating various methods and techniques for selecting a resource host for placement according to an infrastructure diversity constraint analysis, according to some embodiments.

FIG. 6 is a high-level flowchart illustrating various methods and techniques for selecting a resource host for placement according to an infrastructure diversity constraint analysis, according to some embodiments. As indicated at 610, candidate resource host(s) may be identified from among multiple resource hosts for placing a resource. For example, as discussed above with regard to FIG. 3, a placement request may indicate various features or characteristics of the resource to be placed. The placement request for a data volume, for instance, may have a specified storage amount (e.g., 10 Gigabytes). Resource hosts in a data center, fault tolerant zone, physical or logical locality (e.g., particular room or group) may be evaluated to determine whether storage capacity exists to host the specified storage amount for the data volume. Similarly, other features or characteristics (e.g., performance characteristics, location, resource type) may be evaluated for prospective resource hosts to determine whether or not that the resource host is a candidate for placing the resource. In at least some embodiments, a filtering technique may be implemented using such features or characteristics of the resource and/or other requirements for hosting the resource. Randomization, and other selection techniques (e.g., prioritizing certain resource hosts over others), may be performed to identify the candidate resource hosts as a subset of resource hosts which are identified according to the filtering technique. In some embodiments, the evaluation of the utilization data for multiple resource hosts according to the infrastructure diversity constraint may identify those resource hosts which may satisfy the infrastructure diversity constraint. For example, those resource hosts that may pair or group with other resource hosts of different infrastructure units (e.g., different server racks, switches, network routers, etc.) may be recognized as part of the infrastructure diversity constraint analysis.

Once identified, respective scores may be generated for the candidate hosts according to an effect of resource placement on an infrastructure-diverse resource capacity metric for the multiple resource hosts, as indicated at 620, in some embodiments. For example, as discussed above with regard to FIG. 5, an infrastructure-diverse resource capacity metric may be calculated based on the evaluation of the utilization data for the multiple resource hosts according to the infrastructure diversity constraint (e.g., a number of resources that may be placed among the multiple resource hosts while satisfying the infrastructure diversity constraint). The effect of placement of a resource at one of the multiple resource hosts may or may not change the infrastructure-diverse resource capacity metric. Moreover, the change on the infrastructure-diverse resource capacity metric may be small or statistically insignificant. In some embodiments, the effect on the metric may be used to provide a numerical or other score value corresponding to the effect at a candidate host. If, for instance, the effect of placing the resource at a candidate host lowers the number of resources that may be placed among the multiple resource hosts while satisfying the infrastructure diversity constraint, then a lower score value may be generated for the candidate resource host. Alternatively, if the effect of the placement on a candidate resource host maintains (or increases) the number of resources that may be placed among the multiple resource hosts while satisfying the infrastructure diversity constraint, then a higher score value may be generated for the candidate resource host. Evaluating, determining, or calculating the effect of placing a resource at each of the candidate resource hosts may be performed as part of generating the scores for each of the candidate resource hosts.

Other factors, techniques, or considerations may be included in the generation of the respective scores for the candidate resource hosts. For example, in at least some embodiments, the effect of resource placement upon comparisons of respective ratios of current utilization metrics of the candidate resource hosts (including the effect of placing the resource at the candidate resource hosts) with respective ratios of the total resource capacity (i.e., utilized and available) of the candidate resource hosts may be examined. As discussed above with regard to FIGS. 4 and 5, consider an example where the resource is a data volume, with current utilization metrics for storage utilization and throughput (e.g., IOPs). The ratio of currently utilized resources at a candidate host may be modified to include the effect of placing a data volume at the candidate host (e.g., including the storage size utilized (or allocated) over the utilized (or allocated) throughput of the candidate resource host). This modified ratio may then be compared to a ratio of the total capacity of the resource to provide utilization (e.g., storage size/IOP capacity) of the candidate resource host. Consider the scenario where a candidate resource host with currently utilized storage space of 20 Terabytes and currently utilized throughput of 10,000 IOPs out of a total capacity of 25 Terabytes and 12,000 IOPs. The effect of placing a 1 Terabyte data volume with a 1,500 IOPs characteristic may be included with the current utilization data to make the comparison of 21 Terabytes/11,500 IOPs with 25 Terabytes/12,000 IOPs. If, the effect of the placement were to reduce the similarity between the two ratios (e.g., create ratio values that were further apart than the current utilization data ration ratio that does not include the effect of the placement), then a score value may be generated for a candidate resource that is lower than the value generated for a candidate resource host that did not affect the similarity between the two ratios. Consider another example where the current utilization ratio of bytes to IOPS of a resource host is 4/2 (=2) and the total capacity of the resource host has a ratio of 5/3 (=1.6667). If a data volume placement changes the utilization ratio to 4.5/2.5 (=1.8), then the effect of the placement at the candidate resource host increases the similarity (e.g. 1.8 is closer to 1.6667 than 2). Thus a better score value may be generated for the candidate resource. If, however, the data volume placement changes the utilization ration to 4.8/2.2 (=2.18182), then the effect of the placement at the candidate resource decreases the similarity (as 2.18182 is further away from 1.667 than 2). By comparing changes to current utilization metrics with respect to the capacity metrics for a candidate resource host, a placement decision may be identified which ensures that all of the capacity metrics may be optimally utilized at a resource host. For example, by maintaining a similar bytes/IOPs ratio of current utilization to total capacity, efficient utilization of both bytes and IOPs at a resource host may be accomplished. These comparisons, along with other factors, techniques, or considerations, may be used to generate composite scores for the candidate resource hosts, in some embodiments, in addition to the scores generated according to the effect of resource placement on the infrastructure-diverse resource capacity metric.

As indicated at 630, a candidate resource host for placing the resource may be determined based, at least in part, on the respective scores for the candidate resource hosts, in some embodiments. For example, the candidate resource hosts may be ranked or ordered according to the scores, and the determined candidate resource chosen according to the ranking or ordering. In at least some embodiments, the ranking of the candidate resources hosts may be utilized as a list or ordering of locations to attempt placement of the resource, which may indicate a next candidate resource host if a candidate resource host that was determined is no longer available.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 7:
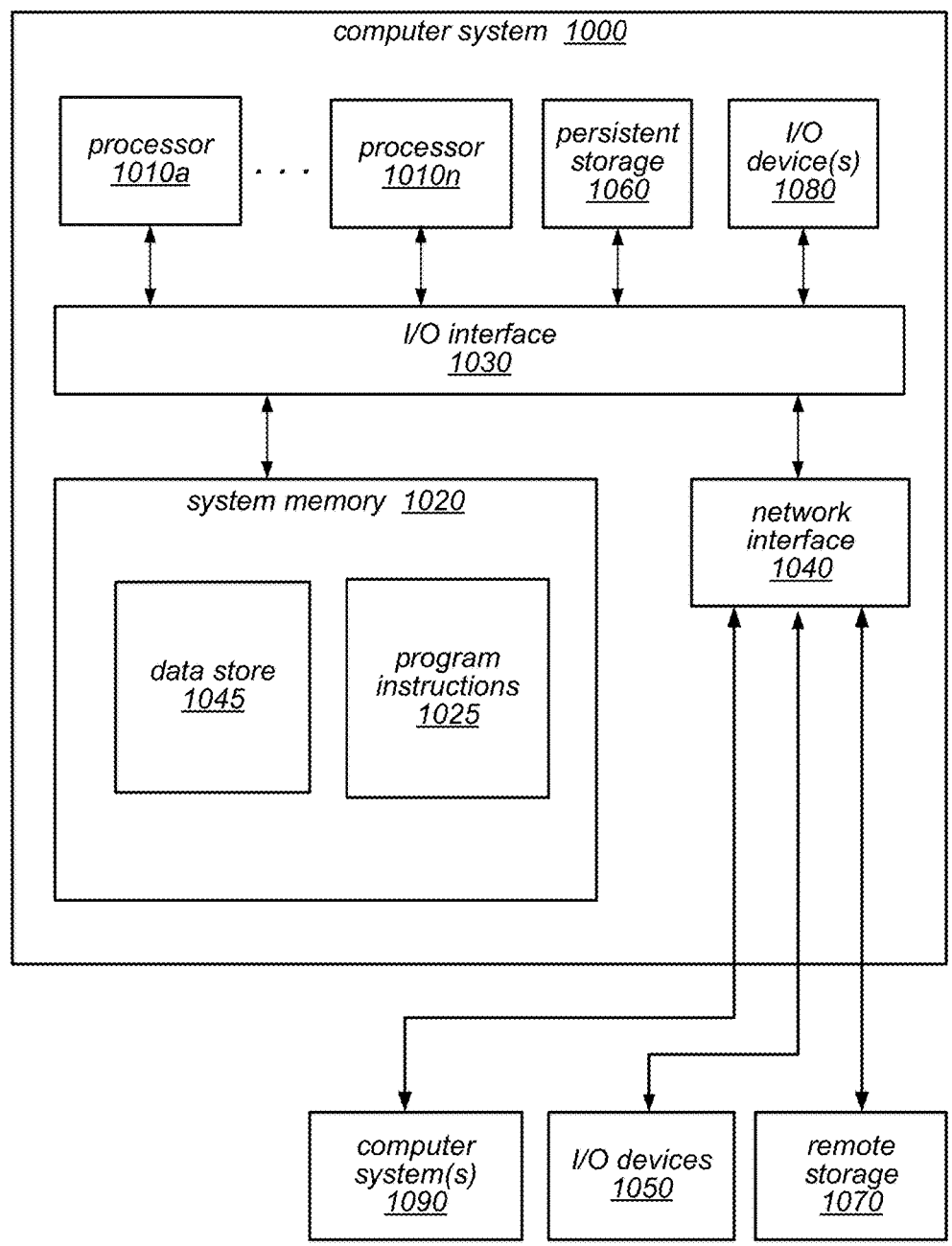
FIG. 7 is a block diagram illustrating an example computing system, according to some embodiments.

Embodiments of optimizing for infrastructure diversity constraints in resource placement as described herein may be executed on one or more computer systems, which may interact with various other devices. FIG. 7 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations, though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
one or more computing devices that include one or more central processing units, the one or more computing devices configured to implement a plurality of different resource hosts at respective infrastructure units of a plurality of infrastructure units of the distributed system; and
a resource placement manager implemented via one or more central processing units, configured to:
receive a request to place a resource at one of the plurality of different resource hosts;
in response the receipt of the request:
obtain utilization data of the plurality of different resource hosts;
evaluate the utilization data according to an infrastructure diversity constraint to determine respective effects of placing the resource at different ones of the resource hosts upon an ability of the resource hosts to accept subsequent placement of a different resource and one or more other resources associated with the different resource while satisfying the infrastructure diversity constraint for the different resource and the one or more other resources with regard to the plurality of infrastructure units;
based, at least in part, on the evaluation of the utilization data according to the infrastructure diversity constraint, select one resource host of the distributed system to place the resource, wherein the selected resource host has available capacity to receive the resource for placement and is selected at least in part to permit satisfaction of the diversity constraint with regard to the plurality of infrastructure units for the resource, and wherein the selected resource host is selected at least in part to permit satisfaction of the infrastructure diversity constraint with regard to the plurality of infrastructure units for another resource that is to be subsequently placed at one of the plurality of resource hosts; and
direct placement of the resource at the selected resource host.

2. The system of claim 1,
wherein to evaluate the utilization data of the plurality of different resource hosts according to the infrastructure diversity constraint, the resource placement manager is configured to calculate an infrastructure-diverse resource capacity metric for the plurality of different resource hosts;
wherein to select the one resource host of the distributed system to place the resource, the resource placement manager is configured to:
identify a plurality of candidate hosts from among the plurality of different resource hosts for placing the resource;
generate respective scores for different ones of the plurality of candidate hosts according to an effect of resource placement at the respective candidate host on the infrastructure-diverse resource capacity metric for the plurality of different resource hosts; and
determine the selected resource host for placing the resource based, at least in part, on the respective scores for the plurality of candidate hosts.

3. The system of claim 1, wherein the resource placement manager is further configured to:
respectively aggregate the utilization data according to the plurality of infrastructure units; and
wherein the evaluation is performed upon the aggregate utilization data for the plurality of infrastructure units.

4. The system of claim 1, wherein the distributed system is implemented as part of a network-based block-based storage service, wherein the resource is a data volume maintained for a client of the network-based block-based storage service.

5. A method, comprising:
performing, by one or more computing devices:
receiving a request to place a resource at one of a plurality of different resource hosts of a distributed system, wherein the plurality of different resource hosts are respectively implemented at an infrastructure unit of a plurality of infrastructure units of the distributed system;
in response to receiving the request:
evaluating utilization data of the plurality of different resource hosts according to an infrastructure diversity constraint to determine respective effects of placing the resource at different ones of the resource hosts upon an ability of the resource hosts to accept subsequent placement of a different resource and one or more other resources associated with the different resource while satisfying the infrastructure diversity constraint for the different resource and the one or more other resources with regard to the plurality of infrastructure units;
based, at least in part, on the respective effects of placing the resource at the different ones of the resource hosts, selecting one resource host of the distributed system to place the resource, wherein the selected resource host has available capacity to receive the resource for placement and is selected at least in part to permit satisfaction of the diversity constraint with regard to the plurality of infrastructure units for the resource, and wherein the selected resource host is selected at least in part to permit satisfaction of the infrastructure diversity constraint with regard to the plurality of infrastructure units for another resource that is to be subsequently placed at one of the plurality of resource hosts; and
placing the resource at the selected resource host.

6. The method of claim 5,
wherein evaluating the utilization data of the plurality of different resource hosts according to the infrastructure diversity constraint comprises calculating an infrastructure-diverse resource capacity metric for the plurality of different resource hosts;
wherein selecting the one resource host of the distributed system to place the resource comprises:
identifying a plurality of candidate hosts from among the plurality of different resource hosts for placing the resource;
generating respective scores for different ones of the plurality of candidate hosts according to an effect of resource placement at the respective candidate host on the infrastructure-diverse resource capacity metric for the plurality of different resource hosts; and
determining the selected resource host for placing the resource based, at least in part, on the respective scores for the plurality of candidate hosts.

7. The method of claim 6, wherein generating the respective scores for the plurality of candidate hosts is based, at least in part, on the effect of resource placement upon comparisons of current utilization metrics of the plurality of different resource hosts with capacity metrics for the plurality of different resource hosts.

8. The method of claim 5, further comprising:
collecting the utilization data of the plurality of different resource hosts;
respectively aggregating the utilization data according to the plurality of infrastructure units; and
wherein the evaluation is performed upon the aggregate utilization data for the plurality of infrastructure units.

9. The method of claim 5, wherein the utilization data comprises storage capacity of the plurality of different resource hosts.

10. The method of claim 5, wherein the evaluation of the utilization data of the plurality of different resource hosts according to the infrastructure diversity constraint is based, at least in part, on historic resource placement data for the plurality of different resource hosts.

11. The method of claim 5, wherein the plurality of infrastructure units are a plurality of network routers, wherein the plurality of different resource hosts respectively implemented at the infrastructure unit are respectively connected to a network router of the plurality of network routers, and wherein the infrastructure diversity constraint comprises a requirement that associated resources be placed at different resource hosts connected to two or more different network routers of the plurality of network routers.

12. The method of claim 5, wherein the request to place the resource at one of the plurality of different resource hosts of the distributed system is a request to create a new resource at the distributed system.

13. The method of claim 5, wherein the distributed system is a network-based service, and wherein the resource is placed for a client of the network-based service.

14. A non-transitory, computer-readable storage medium, storing program instructions that when executed by one or more computing devices cause the one or more computing devices to implement:
receiving a request to place a resource at one of a plurality of different resource hosts of a distributed system, wherein the plurality of different resource hosts are respectively implemented at an infrastructure unit of a plurality of infrastructure units of the distributed system;
in response to receiving the request:
evaluating utilization data of the plurality of different resource hosts according to an infrastructure diversity constraint to determine respective effects of placing the resource at different ones of the resource hosts upon an ability of the resource hosts to accept subsequent placement of a different resource and one or more other resources associated with the different resource while satisfying the infrastructure diversity constraint for the different resource and the one or more other resources with regard to the plurality of infrastructure units;
based, at least in part, on the respective effects of placing the resource at the different ones of the resource hosts, selecting one resource host of the distributed system to place the resource, wherein the selected resource host has available capacity to receive the resource for placement and is selected at least in part to permit satisfaction of the diversity constraint with regard to the plurality of infrastructure units for the resource, and wherein the selected resource host is selected at least in part to permit satisfaction of the infrastructure diversity constraint with regard to the plurality of infrastructure units for another resource that is to be subsequently placed at one of the plurality of resource hosts; and
placing the resource at the selected resource host.

15. The non-transitory, computer-readable storage medium of claim 14,
wherein, in evaluating the utilization data of the plurality of different resource hosts according to the infrastructure diversity constraint, the program instructions cause the one or more computing devices to implement calculating an infrastructure-diverse resource capacity metric for the plurality of different resource hosts;
wherein, in selecting the one resource host of the distributed system to place the resource, the program instructions cause the one or more computing devices to implement:
identifying a plurality of candidate hosts from among the plurality of different resource hosts for placing the resource;
generating respective scores for different ones of the plurality of candidate hosts according to an effect of resource placement at the respective candidate host on the infrastructure-diverse resource capacity metric for the plurality of different resource hosts; and
determining the selected host for placing the resource based, at least in part, on the respective scores for the plurality of candidate hosts.

16. The non-transitory, computer-readable storage medium of claim 14, wherein the program instructions cause the one or more computing devices to further implement:
collecting the utilization data of the plurality of different resource hosts;
respectively aggregating the utilization data according to the plurality of infrastructure units; and
wherein the evaluation is performed upon the aggregate utilization data for the plurality of infrastructure units.

17. The non-transitory, computer-readable storage medium of claim 14, wherein the utilization data comprises throughput capacity of the plurality of different resource hosts.

18. The non-transitory, computer-readable storage medium of claim 14, wherein the plurality of infrastructure units are a plurality of server racks, wherein the plurality of different resource hosts respectively implemented at the infrastructure unit are respectively located at a server rack of the plurality of server racks, and wherein the infrastructure diversity constraint comprises a requirement that associated resources be placed at different resource hosts implemented at two or more different server racks of the plurality of server racks.

19. The non-transitory, computer-readable storage medium of claim 14, wherein the request to place the resource at one of the plurality of different resource hosts of the distributed system is a request to move a resource hosted at another resource host of the distributed system.

20. The non-transitory, computer-readable storage medium of claim 14, wherein the distributed system is a network-based computing service, wherein the resource is a virtual compute instance requested via the network-based computing service for a client of the network-based computing service.

* * * * *